(12) United States Patent
Koike et al.

(10) Patent No.: US 7,641,723 B2
(45) Date of Patent: *Jan. 5, 2010

(54) INK JET RECORDING INK, RECORDING METHOD AND RECORDING APPARATUS

(75) Inventors: Shoji Koike, Yokohama (JP); Ryota Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

This patent is subject to a terminal disclaimer.

(21) Appl. No.: 11/730,827

(22) Filed: Apr. 4, 2007

(65) Prior Publication Data

US 2008/0152811 A1 Jun. 26, 2008

(30) Foreign Application Priority Data

Apr. 5, 2006 (JP) .............................. 2006-103725

(51) Int. Cl.
*C09D 11/02* (2006.01)
*B41J 2/01* (2006.01)

(52) U.S. Cl. .............. 106/31.43; 106/31.58; 106/31.75; 106/31.86; 347/100

(58) Field of Classification Search .............. 106/31.43, 106/31.58, 31.75, 31.86; 347/100
See application file for complete search history.

(56) References Cited

U.S. PATENT DOCUMENTS

| 4,557,761 A | 12/1985 | Kobayashi et al. ............ 106/22 |
| 4,632,703 A | 12/1986 | Koike et al. .................... 106/22 |
| 4,661,158 A | 4/1987 | Kobayashi et al. ............ 106/22 |
| 4,689,078 A | 8/1987 | Koike et al. .................... 106/22 |
| 4,702,742 A | 10/1987 | Iwata et al. ...................... 8/495 |
| 4,838,938 A | 6/1989 | Tomida et al. ................. 106/22 |
| 4,849,770 A | 7/1989 | Koike et al. .................. 346/1.1 |
| 4,853,036 A | 8/1989 | Koike et al. .................... 106/20 |
| 4,923,515 A | 5/1990 | Koike et al. .................... 106/22 |
| 4,957,553 A | 9/1990 | Koike et al. .................... 106/20 |
| 4,965,609 A | 10/1990 | Tomida et al. ................ 346/1.1 |
| 4,965,612 A | 10/1990 | Sakaki et al. ................. 346/1.1 |
| 4,969,951 A | 11/1990 | Koike et al. .................... 106/22 |
| 4,973,499 A | 11/1990 | Iwata et al. ................... 427/261 |

(Continued)

FOREIGN PATENT DOCUMENTS

JP 61-59911 3/1986

(Continued)

*Primary Examiner*—Helene Klemanski
(74) *Attorney, Agent, or Firm*—Fitzpatrick, Cella, Harper & Scinto

(57) ABSTRACT

An ink jet recording ink is provided which does not have a problem concerning curling of a recording medium containing cellulose, and can deal with high-definition image recording while maintaining good response at a high level during ejection at a high drive frequency and good startup properties. The ink contains at least water, a colorant, a compound represented by the following general formula (I) accounting for 8 to 40% by mass of the total mass of the ink, and a water-soluble substance accounting for 5 to 30% by mass of the total mass of the ink, the ratio (A/B) of mass (A) of the compound represented by general formula (I) and mass (B) of the water-soluble substance is in a range of 1/3 to 7/1.

General formula (I)

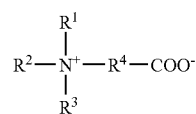

10 Claims, 2 Drawing Sheets

U.S. PATENT DOCUMENTS

| | | | |
|---|---|---|---|
| 4,986,850 A | 1/1991 | Iwata et al. | 106/25 |
| 5,017,227 A | 5/1991 | Koike et al. | 106/22 |
| 5,053,078 A | 10/1991 | Koike et al. | 106/22 |
| 5,067,980 A | 11/1991 | Koike et al. | 106/22 |
| 5,099,255 A | 3/1992 | Koike et al. | 346/1.1 |
| 5,118,351 A | 6/1992 | Shirota et al. | 106/22 |
| 5,124,718 A | 6/1992 | Koike et al. | 346/1.1 |
| 5,141,558 A | 8/1992 | Shirota et al. | 106/22 |
| 5,151,128 A | 9/1992 | Fukushima et al. | 106/20 |
| 5,190,581 A | 3/1993 | Fukushima et al. | 106/20 D |
| 5,220,347 A | 6/1993 | Fukushima et al. | 346/1.1 |
| 5,250,121 A | 10/1993 | Yamamoto et al. | 106/22 R |
| 5,258,066 A | 11/1993 | Kobayashi et al. | 106/22 R |
| 5,356,464 A | 10/1994 | Hickman et al. | 106/20 R |
| 5,396,275 A | 3/1995 | Koike et al. | 347/101 |
| 5,468,553 A | 11/1995 | Koike et al. | 428/224 |
| 5,494,733 A | 2/1996 | Koike et al. | 428/224 |
| 5,500,023 A | 3/1996 | Koike et al. | 8/499 |
| 5,515,093 A | 5/1996 | Haruta et al. | 347/101 |
| 5,540,764 A | 7/1996 | Haruta et al. | 106/20 R |
| 5,658,376 A | 8/1997 | Noguchi et al. | 106/31.43 |
| 5,686,951 A | 11/1997 | Koike et al. | 347/106 |
| 5,698,478 A | 12/1997 | Yamamoto et al. | 442/153 |
| 5,718,793 A | 2/1998 | Inamoto et al. | 156/235 |
| 5,764,261 A | 6/1998 | Koike et al. | 347/100 |
| 5,781,216 A | 7/1998 | Haruta et al. | 347/106 |
| 5,782,967 A | 7/1998 | Shirota et al. | 106/31.58 |
| 5,902,387 A | 5/1999 | Suzuki et al. | 106/22 R |
| 5,980,623 A * | 11/1999 | Hiraoka et al. | 106/31.58 |
| 5,997,623 A | 12/1999 | Lin | 106/31.58 |
| 6,033,066 A | 3/2000 | Koike et al. | 347/101 |
| 6,036,307 A | 3/2000 | Hakamada et al. | 347/106 |
| 6,139,939 A | 10/2000 | Haruta et al. | 428/195 |
| 6,214,963 B1 | 4/2001 | Noguchi et al. | 528/71 |
| 6,394,597 B1 | 5/2002 | Koike et al. | 347/106 |
| 6,398,355 B1 | 6/2002 | Shirota et al. | 347/100 |
| 6,426,766 B1 | 7/2002 | Shirota et al. | 347/106 |
| 6,474,803 B1 | 11/2002 | Shirota et al. | 347/100 |
| 6,613,821 B2 | 9/2003 | Suzuki et al. | 524/111 |
| 6,698,876 B2 | 3/2004 | Sato et al. | 347/100 |
| 6,723,137 B1 | 4/2004 | Hakamada et al. | 8/549 |
| 6,874,881 B2 | 4/2005 | Shirota et al. | 347/100 |
| 6,890,378 B2 * | 5/2005 | Yatake et al. | 106/31.58 |
| 7,361,699 B2 * | 4/2008 | Wakabayashi | 523/160 |
| 2005/0229811 A1 | 10/2005 | Kato et al. | 106/31.43 |
| 2006/0119680 A1 | 6/2006 | Kato et al. | 347/100 |
| 2007/0256593 A1 | 11/2007 | Koike et al. | 106/31.28 |
| 2008/0187677 A1 * | 8/2008 | Kabalnov | 427/466 |

FOREIGN PATENT DOCUMENTS

| | | |
|---|---|---|
| JP | 61-59912 | 3/1986 |
| JP | 61-59914 | 3/1986 |
| JP | 6-157955 | 6/1994 |
| JP | 11-12520 | 1/1999 |
| JP | 11-43637 | 2/1999 |
| JP | 11-256083 | 9/1999 |

* cited by examiner

INK JET RECORDING INK, RECORDING METHOD AND RECORDING APPARATUS

BACKGROUND OF THE INVENTION

1. Field of the Invention

The present invention relates to an ink jet recording ink (hereinafter abbreviated as an "ink") which is suitable for an ink jet recording method, and to a recording method and recording apparatus which use this ink. The present invention particularly relates to an ink which is free from a problem concerning curling of a recording medium containing cellulose even when the ink as an aqueous ink is applied in a large amount onto the recording medium, and an ink jet recording method and an ink jet recording apparatus which have good response during ejection at a high drive frequency and good startup properties.

2. Description of the Related Art

In ink jet recording methods, recording is made by spouting minute ink droplets and adhering them to a recording medium such as paper. In such methods, there is a thermal system in which an electrothermal energy converter is used as an ejection-energy supply unit to apply thermal energy to an ink to generate bubbles to eject ink droplets. With such a system, high-density multi-nozzles in an ink jet recording head can be easily realized, and it has been reported that high-resolution and high-quality images can be recorded at high speed (see, for example, Japanese Patent Publication Nos. S61-059911, S61-059912 and S61-059914).

Recently, the size of ink droplets ejected from a single nozzle has come to be made smaller for the purpose of providing very high-quality ink jet recorded images on a level with silver halide photographs. Currently, ink jet printers are commercially available in which an ink droplet amount is about 5 pL (pico-liter(s)) or smaller. There is also a need for recording speed to be greatly increased. In view of the need for higher speed, the handling of higher drive frequencies and the improvement of startup properties are urgent tasks.

Further, inks used in ink jet recording generally include water as a principal component and additionally a water-soluble high-boiling solvent such as glycol for the purpose of, for example, preventing drying and improving resistance to sticking on the ink jet recording head. When such inks are used to conduct recording on a recording medium containing cellulose as typified by plain paper or trace quantity coated paper, a problem is raised in that the recording medium warps, or in other words "curls", if they are applied in a large amount to a region not smaller than a certain area in a short period of time. The occurrence of the curling phenomenon has not been a major problem in conventional recording in which characters are primarily recorded, which has been prevalent in recording, because the applied amount of ink is relatively small. However, the curling has become an important problem to be solved because of the need to apply a large amount of ink onto plain paper or the like when recording Internet homepages or photographic images, as widely carried out in recent years.

In order to solve the problem, aqueous ink compositions containing various anti-curling solvents have been proposed (see, for example, Japanese Patent Application Laid-Open Nos. H06-157955 and H11-012520) Although a certain effect on curling resistance (which means that the effect of suppressing the occurrence of curling is exhibited) is achieved by using these substances, further improvements are sought in respect of the compatibility of responsiveness upon ejection at high drive frequencies and startup properties with curling resistance.

SUMMARY OF THE INVENTION

The various problems of the conventional techniques will be summarized below.

1. Curling Resistance

When a large amount of an aqueous ink is applied onto a recording medium containing cellulose as typified by plain paper, the so-called curling phenomenon occurs. If a strong curling phenomenon occurs, the paper may be rolled up into a cylindrical shape. The mechanism of curling occurrence is considered to be attributable to hydrogen bonds formed between the cellulose molecules as a result of evaporating water in a state that tension has been applied in the fixed direction in the step of drying the paper during the paper making stage. If an aqueous ink is applied to paper in this state, the hydrogen bonds within the cellulose are broken by water, and the bonding sites are replaced by water. When the water evaporates, hydrogen bonds are formed again within the cellulose. Since no tension is acting on the paper when the hydrogen bonds are reformed, the paper shrinks toward the ink-applied side, so that curling is considered to occur.

Not much attention has been paid to this phenomenon because, in conventional recording in which the formed images are mainly composed of characters, the applied amount of ink is relatively small. However, this phenomenon has become serious at the present time the frequency of graphic printing, in which the applied amount of ink is large, is increasing. There is thus a need for a marked improvement in curling resistance during image formation. The curling seriously occurs especially when recording is carried out on a recording medium containing cellulose such as plain paper under the conditions that a recording area is 15 $cm^2$ or more and a aqueous ink is applied in an amount of from 0.03 $mg/cm^2$ to 30 $mg/cm^2$.

2. Frequency Response

When ejection is continuously conducted at a high drive frequency in an on-demand type ink jet system, and especially in a thermal ink jet system, depending on the physical and/or chemical properties of an ink, nozzles cannot be refilled with the ink in some cases. Therefore, the next ejection may start before the nozzles are refilled. As a result, ejection failure occurs, or the ejected amount of the ink is extremely reduced. This phenomenon is more marked as ink droplets being ejected become smaller, such as 5 pL or less.

3. Startup Properties

In an on-demand system, if droplet formation is not carried out in a certain time period, the relative concentration of a colorant will increase due to evaporation of moisture in the ink at the nozzle tip, so that the ink viscosity at the nozzle tip portion increases, whereby the ejection is no longer normally effected. As a result, the so-called "startup properties" deteriorate, where the dot placement becomes imprecise or the dot size decreases at the portion where writing is started. This phenomenon is especially marked in a low-humidity environment which promote the evaporation of ink from the nozzle tip, and in a low-temperature environment which increase the overall viscosity. This characteristic becomes more noticeable as ink droplets become smaller.

Conventionally, to resolve the above problem, for example, in the case of a serial printer, if a time that a recording head faced the recording surface was no more than 5 continuous seconds, ink was ejected outside the printing region and ink in the nozzle was replaced. Further, the problem was usually dealt with by frequently conducting a restoration operation of stopping the printing action to suck the ink or to apply pressure to the ink. However, for example, in the case of a broadsheet printer, since a single scan length is long, performance equal to or better than the conventional art is required. Further, with a line head mounted printer which uses heads fixed without serially driving them, the problem is more serious because a restoration operation cannot be frequently carried out due to the structure of the apparatus.

Accordingly, an object of the present invention is to provide an ink that is not involved with a problem concerning curling of a recording medium containing cellulose, and can perform high-definition image recording while maintaining good response at a high level during ejection at a high drive frequency and good startup properties. A further object of the present invention is to provide an ink jet recording method that can constantly form high-quality images. A further object of the present invention is to provide an ink jet recording apparatus that can be applied to the ink jet recording method.

The above objects can be achieved by the present invention as described below. Specifically, the present invention is an ink which includes at least water, a colorant, a compound represented by the following general formula (I) accounting for 8 to 40% by mass of a total mass of the ink, and a water-soluble substance accounting for 5 to 30% by mass of the total mass of the ink, wherein the water-soluble substance is at least one compound selected from the group consisting of a compound represented by the following general formula (II), polyalkylene glycol having a molecular weight of 200 to 1,000, polyglycerin and bishydroxyethyl sulfone, and a ratio (A/B) of mass (A) of the compound represented by general formula (I) and mass (B) of the water-soluble substance is in a range of 1/3 to 7/1, General formula (I)

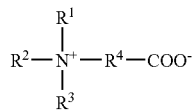

(In the formula, $R^1$, $R^2$ and $R^3$ each independently represent a hydrogen atom or an alkyl group having 1 to 4 carbon atoms, and $R^4$ represents an alkylene group having 1 to 5 carbon atoms.)

$$R^5R^6NCONHCH_2CH_2OH \qquad \text{General formula (II)}$$

(In the formula, $R^5$ and $R^6$ each independently represent a hydrogen atom or $C_nH_{2n}OH$ ("n" is 2 or 3), and $R^5$ and $R^6$ are not a hydrogen atom at the same time.)

The present invention is also an ink jet recording method which conducts recording by using an ink jet recording head to apply ink onto a recording medium containing cellulose where a recording area on the recording medium is 15 cm² or more, and an amount of ink applied onto the recording medium is 0.03 to 30 mg/cm², wherein the ink applied onto the recording medium comprises at least water, a colorant, a compound represented by the following general formula (I) accounting for 8 to 40% by mass of a total mass of the ink, and a water-soluble substance accounting for 5 to 30% by mass of the total mass of the ink, wherein the water-soluble substance is at least one compound selected from the group consisting of a compound represented by the following general formula (II), polyalkylene glycol having a molecular weight of 200 to 1,000, polyglycerin and bishydroxyethyl sulfone, and a ratio (A/B) of mass (A) of the compound represented by general formula (I) and mass (B) of the water-soluble substance is in a range of 1/3 to 7/1, General formula (I)

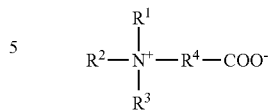

(In the formula, $R^1$, $R^2$ and $R^3$ each independently represent a hydrogen atom or an alkyl group having 1 to 4 carbon atoms, and $R^4$ represents an alkylene group having 1 to 5 carbon atoms.)

$$R^5R^6NCONHCH_2CH_2OH \qquad \text{General formula (II)}$$

(In the formula, $R^5$ and $R^6$ each independently represent a hydrogen atom or $C_nH_{2n}OH$ ("n" is 2 or 3), and $R^5$ and $R^6$ are not a hydrogen atom at the same time.)

The present invention also provides an ink jet recording apparatus including an ink storage portion for storing the ink according to the present invention, and an ink jet head for ejecting the ink.

According to the present invention, curling is unlikely to be a problem even in the case where a large amount of aqueous ink is applied to a recording medium containing cellulose. The present invention is particularly effective in the case where the amount of ink applied onto a recording medium containing cellulose which has a recording area of 15 cm² or more is in the range of 0.03 to 30 mg/cm². The effects of the present invention are even more marked when the amount of ink being applied is in the range of 0.1 to 20 mg/cm².

In addition, according to the present invention, high-definition image recording can be effected while maintaining good response at a high level during ejection at a high drive frequency and good startup properties. As for the response during ejection at a high drive frequency, the effects of the present invention are especially marked when using a thermal ink jet system.

Further features of the present invention will become apparent from the following description of exemplary embodiments with reference to the attached drawings.

DESCRIPTION OF THE EMBODIMENTS

Figure 1:
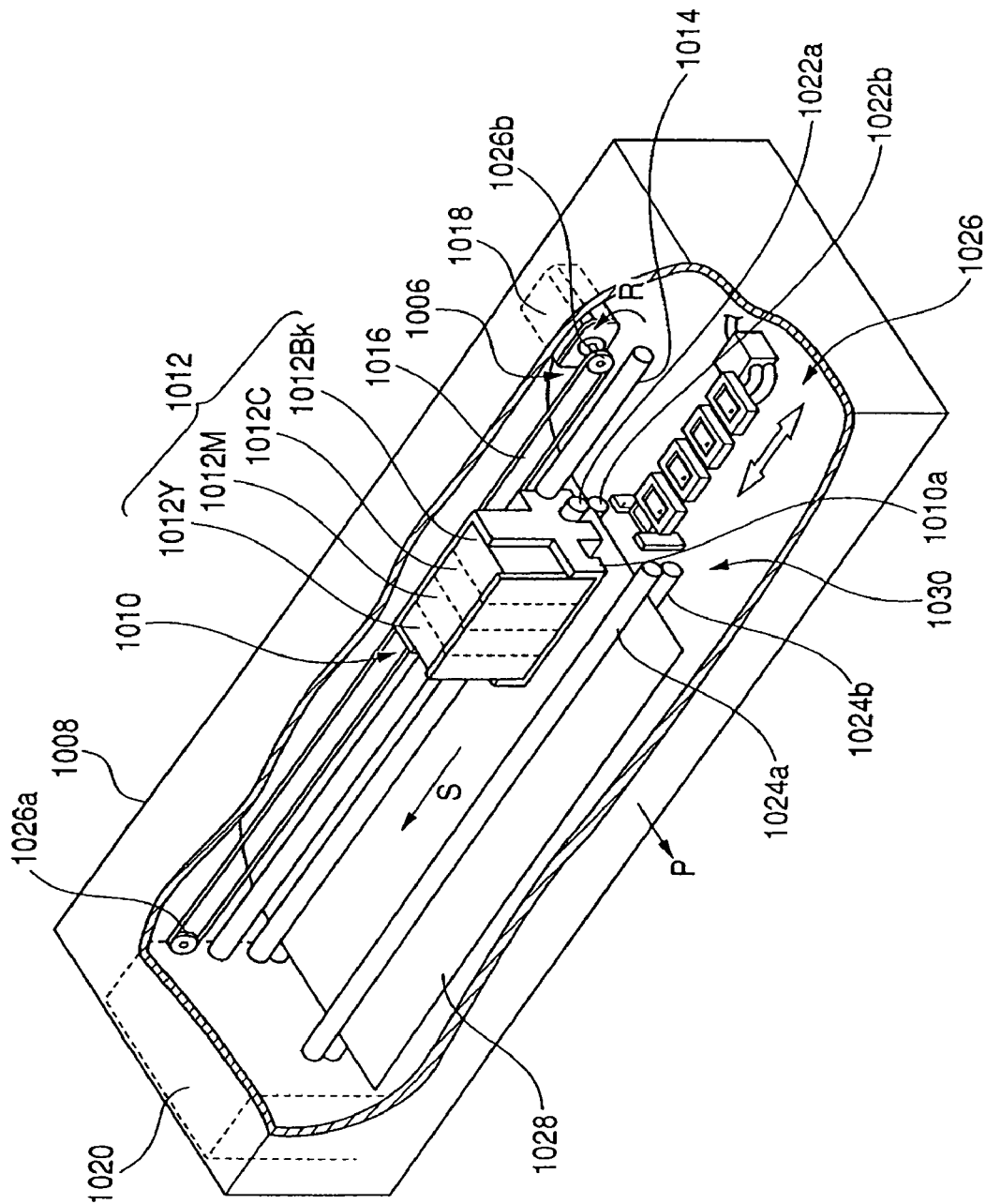
FIG. 1 is a schematic perspective view illustrating the main parts of one example of an ink jet printer, in which a liquid ejection head can be mounted.

The present inventors conducted research on the basic properties of the ink used for ink jet recording taking into account the future technical trends as described above. The present inventors also conducted research on ink which is free from a problem concerning curling of a recording medium containing cellulose. In addition, the present inventors carried out intensive investigation into ink which can deal with high-definition image recording while maintaining good response at a high level during ejection at a high drive frequency (specifically, at a frequency exceeding 10 kHz) and good startup properties. As a result, the inventors arrived at the present invention through the discovery of an ink which can achieve the above-described objects at a very high level which includes a compound having specific properties in a specific constitution.

The present invention will now be described in further detail with reference to some exemplary embodiments thereof.

(Overall Structure of the Ink)

The ink according to the present invention is characterized by including at least water, a colorant, a compound represented by the following general formula (I) accounting for 8 to 40% by mass of a total mass of the ink, and a water-soluble substance accounting for 5 to 30% by mass of the total mass of the ink, wherein the water-soluble substance is at least one compound selected from the group consisting of a compound represented by the following general formula (II), polyalkylene glycol having a molecular weight of 200 to 1,000, polyglycerin and bishydroxyethyl sulfone, and a ratio (A/B) of mass (A) of the compound represented by general formula (I) and mass (B) of the water-soluble substance is in a range of 1/3 to 7/1, General formula (I)

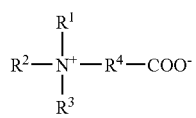

(In the formula $R^1$, $R^2$ and $R^3$ each independently represent a hydrogen atom or an alkyl group having 1 to 4 carbon atoms, and $R^4$ represents an alkylene group having 1 to 5 carbon atoms.)

 General formula (II)

(In the formula, $R^5$ and $R^6$ each independently represent a hydrogen atom or $C_nH_{2n}OH$ ("n" is 2 or 3), and $R^5$ and $R^6$ are not a hydrogen atom at the same time.)

(Compounds Represented by General Formula (I))

The ink according to the present invention must include an amphoteric compound represented by general formula (I) which characterizes the invention. Although the compound represented by general formula (I) can be obtained by refining and isolating sugar beet, it may also be synthesized by various conventional processes. Preferable specific examples of the compound represented by general formula (I) are listed in Table 1 with the substituents $R^1$, $R^2$, $R^3$ and $R^4$ defined. However, the present invention is not limited to these examples. From the perspective of water retention capacity per unit mass, among these examples, trimethyl glycine (Compound 1) is especially preferable.

TABLE 1

|  | $R^1$ | $R^2$ | $R^3$ | $R^4$ |
|---|---|---|---|---|
| Compound (1) | $CH_3$ | $CH_3$ | $CH_3$ | $CH_2$ |
| Compound (2) | $CH_3$ | $CH_3$ | $CH_3$ | $C_2H_4$ |
| Compound (3) | $CH_3$ | $CH_3$ | $CH_3$ | $C_3H_6$ |
| Compound (4) | $CH_3$ | $CH_3$ | $CH_3$ | $C_4H_8$ |
| Compound (5) | $CH_3$ | $CH_3$ | H | $CH_2$ |
| Compound (6) | $CH_3$ | H | H | $CH_2$ |
| Compound (7) | $C_2H_5$ | $C_2H_5$ | $C_2H_5$ | $CH_2$ |
| Compound (8) | $C_3H_7$ | H | H | $CH_2$ |
| Compound (9) | $C_4H_9$ | H | H | $CH_2$ |

The content in the ink of the compound represented by general formula (I) is 8 to 40% by mass, preferably 8 to 35% by mass, and more preferably 8 to 30% by mass, of the total mass of the ink. If the content in the ink of the compound represented by general formula (I) is less than 8% by mass, sufficient startup properties cannot be attained. On the other hand, if the content in the ink of the compound represented by general formula (I) is more than 40% by mass, the viscosity of the ink increases, whereby sufficient frequency response cannot be attained.

(Water-Soluble Substance)

In addition, from the point of controlling the hydration state with respect to each substance in the ink, the ink according to the present invention contains a water-soluble substance having a specific structure. Specifically, the water-soluble substance at least one compound selected from the group consisting of a compound represented by the following general formula (II), polyalkylene glycol having a molecular weight of 200 to 1,000, polyglycerin and bishydroxyethyl sulfone.

 General formula (II)

In the formula, $R^5$ and $R^6$ each independently represent a hydrogen atom or $C_nH_{2n}OH$ ("n" is 2 or 3), and $R^5$ and $R^6$ are not a hydrogen atom at the same time.

The content of the water-soluble substance in the ink is 5 to 30% by mass of the ink total mass. If the content of the water-soluble substance in the ink is less than 5% by mass, sufficient frequency response cannot be attained, while if the content of the water-soluble substance in the ink is more than 30% by mass, sufficient startup properties cannot be attained.

The ratio (A/B) of the mass (A) of the compound represented by general formula (I) and the mass (B) of the water-soluble substance must be in a range of from 1/3 to 7/1. If the used amount of the compound represented by general formula (I) is less than 1/3 the amount of water-soluble substance used, sufficient startup properties cannot be attained. On the other hand, if the used amount of the compound represented by general formula (I) is more than 7 times the amount of water-soluble substance used, sufficient frequency response cannot be attained.

Further, if the content of the water-soluble substance in the ink and the ratio of the mass of the compound represented by general formula (I) and the mass of the water-soluble substance in the ink do not satisfy the above conditions, problems will occur especially with either the anti curling effects or the startup properties.

Inks containing a part of the compound represented by general formula (I) have been proposed in Japanese Patent Application Laid-Open Nos. H11-256083 and H11-43637. However, these documents do not describe the contents for the compound represented by general formula (I) and the water-soluble substance, and nor do these documents describe that an appropriate content ratio is selected when using these together.

(Aqueous Medium)

The ink according to the present invention includes water as an essential component. The content of water in the ink is preferably 30% by mass or more and 85% by mass or less of the ink total mass. Further, as described above, the water-soluble substance, an essential component that is used together with water, is at least one compound selected from the group consisting of a compound represented by general formula (II), polyalkylene glycol having a molecular weight of 200 to 1,000, polyglycerin and bishydroxyethyl sulfone.

The ink according to the present invention may contain other water-soluble substances as necessary. Examples of the water-soluble substances include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol and n-pentanol; amides such as dimethylformamide and dimethylacetamide; ketones and keto-alcohols such as acetone and diacetone alcohol; ethers such as tetrahydrofuran and dioxane; glycols such as diethylene glycol, triethylene glycol, tetraethylene glycol and dipropylene glycol; alkylene glycols having an alkylene moiety of 2 to 6 carbon atoms, such as ethylene glycol, propylene glycol, trimethylene glycol, 1,4-butanediol, 1,5-pentanediol and 1,6-hexanediol; triols such as 1,2,6-hexanetriol, glycerol and trimethylolpropane; lower alkyl ethers of glycols, such as ethylene glycol monomethyl (or monoethyl)ether, diethylene glycol monomethyl (or monoethyl)ether and triethylene glycol monomethyl (or monoethyl or monobutyl)ether; lower dialkyl ethers of polyhydric alcohols, such as triethylene glycol dimethyl (or diethyl)ether and tetraethylene glycol dimethyl (or diethyl)ether; alkanolamines such as monoethanolamine, diethanolamine and triethanolamine; and sulfolane, N-methyl-2-pyrrolidone, 2-pyrrolidone, 1,3-dimethyl-2-imidazolidinone, urea and ethyleneurea.

(Colorant)

Dyes and pigments may be used for the colorant contained in the ink according to the present invention. The content of the colorant in the ink may be, although it is not restricted to, 0.1 to 15% by mass, preferably 0.2 to 12% by mass, and more preferably 0.3 to 10% by mass, of the total mass of the ink. Examples of dyes which can be used in the ink include almost all of the water-soluble acid dyes, direct dyes, basic dyes and reactive dyes described in the Color Index. Further, even dyes not described in the Color Index may be used, so long as they are water-soluble dyes.

Specific examples of the dyes used in the present invention include, and are not limited to: dyes used in yellow inks, e.g., C.I. Direct Yellow 173, 142, 144, 86 and 132, and C.I. Acid Yellow 23 and 17; dyes used in magenta inks, e.g., C.I. Acid Red 92, 289, 35, 37 and 52; dyes used in cyan inks, e.g., C.I. Acid Blue 9, 7, 103, 1 and 90, and C.I. Direct Blue 86, 87 and 199; and dyes used in black inks, e.g., C.I. Food Black 2, and C.I. Direct Black 52, 154, 168 and 195.

In the present invention, a pigment may also be used as a colorant. The pigment used in the black ink is preferably carbon black. Examples of carbon black include furnace black, lamp black, acetylene black and channel black. The carbon black pigment preferably has a primary particle size of 15 to 40 nm, a specific surface area of 50 to 300 $m^2/g$ as measured by the BET method, a DBP oil absorption of 40 to 150 ml/100 g, and a volatile content of 0.5 to 10% by mass.

The pigments used in color inks are preferably organic pigments. Specific examples include: insoluble azo pigments such as Toluidine Red, Toluidine Maroon, Hansa Yellow, Benzidine Yellow and Pyrazolone Red; water-soluble azo pigments such as Lithol Red, Herio Bordeaux, Pigment Scarlet and Permanent Red 2B; derivatives from vat dyes, such as alizarin, indanthrone and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; thioindigo pigments; condensation azo pigments; diketopyrrolopyrrole pigments; and pigments such as Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet.

Specific examples of the organic pigments shown by their Color Index (C.I.) Numbers include: C.I. Pigment Yellow: 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180 and 185; C.I. Pigment Orange: 16, 36, 43, 51, 55, 59, 61 and 71; C.I. Pigment Red: 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255 and 272; C.I. Pigment Violet: 19, 23, 29, 30, 37, 40 and 50; C.I. Pigment Blue: 15, 15:1, 15:3, 15:4, 15:6, 22, 60 and 64; C.I. Pigment Green: 7 and 36; and C.I. Pigment Brown: 23, 25 and 26.

Pigments other than the above examples may also be used. Of the pigments listed above, particularly preferred are the following: C.I. Pigment Yellow: 13, 17, 55, 74, 93, 97, 98, 110, 128, 139, 147, 150, 151, 154, 155, 180 and 185; C.I. Pigment Red: 122, 202 and 209; and C.I. Pigment Blue: 15:3 and 15:4.

When using the pigment as a colorant, the average particle size of the pigment is preferably in the range of 50 nm to 200 nm. The average particle size may be measured using an ELS-8000 (manufactured by Otsuka Electronics Co., Ltd.), Microtrac UPA 150 (manufactured by Nikkiso Co., Ltd.) by utilizing laser light scattering.

(Dispersing Agent)

In the case of using a pigment as the colorant, it is preferable to use a pigment dispersing agent. The dispersing agent for dispersing the pigment is not especially limited so long as it is soluble in water. Specific examples include block copolymers, graft copolymers and random copolymers of the following monomers, and salts thereof. At least one of monomers constituting the above copolymers is preferably a hydrophilic monomer. Examples of the monomer include styrene, styrene derivatives, vinylnaphthalene, vinylnaphthalene derivatives, aliphatic alcohol esters of $\alpha,\beta$-ethylenically unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinyl acetate derivatives, vinylpyrrolidone, vinylpyrrolidone derivatives, acrylamide and acrylamide derivatives. Among these examples, block copolymers are particularly preferred as a dispersing agent for carrying out the present invention. In particular, when recording is conducted with a head using thermal energy at a high drive frequency, for example, 10 kHz or more, by employing such a block copolymer in the ink according to the present invention, the improvement in ejection properties is more noticeable.

The content of dispersing agent in the ink is preferably within the range of 0.5 to 10% by mass, more preferably, 0.8 to 8% by mass, and still more preferably, 1 to 6% by mass, of the total mass of the ink. If the content of the dispersing agent is greater than this range, it is difficult to maintain the desired ink viscosity.

(Other Additives)

To attain better balanced ejection stability, the ink according to the present invention preferably contains a surfactant in the ink. A nonionic surfactant is especially preferable as the surfactant. More preferably, the surfactant is polyoxyethylene alkyl ether or an ethylene oxide adduct of acetylene glycol. The HLB (hydrophile-lipophile balance) value of these nonionic surfactants is 10 or more.

In addition to the above-described components, additives other than a surfactant, such as a viscosity modifier, an antifoaming agent, a preservative, a mildew-proofing agent and an antioxidant may be added to the ink according to the present invention, as needed, to provide an ink having desired physical property values. It is preferable to select the additives in such a manner that the surface tension of the resulting ink is 25 mN/m or more, and preferably 28 mN/m or more.

(Ink Jet Recording Method)

The ink jet recording method according to the present invention is characterized by having a step of applying the ink according to the present invention with an ink jet head onto a recording medium containing cellulose where the recording area is 15 cm$^2$ or more and the application amount of the ink is in the range of 0.03 to 30 mg/cm$^2$.

The ink jet head used in the method according to the present invention is not specifically limited, and may be any conventionally known ink jet head. Suitable examples will be described in the following "Ink Jet Recording Apparatus". In the method according to the present invention, the above-described ink according to the present invention is applied in a specific amount onto a recording medium containing cellulose in which the recording area is 15 cm$^2$ or more. Examples of the recording medium include plain paper, lightweight coated paper and the like. However, in particular, the recording medium on which the effects of the present invention are noticeably exhibited is plain paper.

If the recording area on the recording medium is 15 cm$^2$ or more, curling is liable to occur. Further, if the amount of ink applied onto the recording medium is in the range of 0.03 to 30 mg/cm$^2$, curling tends to occur. In the present invention, the application amount of ink is more preferably in the range of 0.1 to 20 mg/cm$^2$. If the application amount of ink is less than 0.03 mg/cm$^2$, the effects of the present invention cannot be attained, and if the application amount of ink is more than 30 mg/cm$^2$, depending on the types of paper, it becomes difficult to attain the effects of the present invention.

In the above-described method of the present invention, the effects of the present invention can be even more noticeably achieved if the ink jet recording method is of a thermal system. In a thermal ink jet recording system, ink is bubbled by thermal energy from a heater, and the resulting pressure causes the ink to spout. In such a system, every time a bubble is formed, the ink is exposed to high temperature and high pressure, and deposit is slightly generated from the materials although its amount is uncertain. Such deposit is hardly soluble in water, and thus may cause kogation on the heater. The deposit may also cause bubbling failure and a decrease in the ejection amount, thereby shortening the life of a head. However, such problems do not occur where the ink of the present invention is used.

The ink jet recording apparatus according to the present invention includes an ink storage portion for storing the ink according to the present invention, and an ink jet head for ejecting the ink. The ink jet head is preferably a thermal ink jet head.

The ink jet recording apparatus according to the present invention is described below, taking the case of an ink jet printer as a specific example. FIG. 1 is a schematic perspective view illustrating the liquid ejection head of an ejection system in which air bubbles communicate with the atmosphere at the time of ejection, and the main parts of one example of an ink jet printer which is a liquid ejection apparatus using this head.

In FIG. 1, the ink jet printer includes a transporting assembly 1030 set in a casing 1008 in its lengthwise direction which transports a sheet 1028 as a recording medium intermittently in the direction shown by an arrow P in the drawing, a recording part 1010 which is reciprocated substantially in parallel with a guide shaft 1014 in the arrow S direction substantially at right angles with the transport direction P in which the sheet 1028 being transported by the transporting assembly 1030, and a movement driving part 1006 as a driving unit which reciprocates the recording part 1010.

The transporting assembly 1030 is furnished with a pair of roller units 1022a and 1022b and a pair of roller units 1024a and 1024b in which the rollers of each pair are so arranged as to face to each other substantially in parallel, and a driving part 1020 for driving each of these roller units. According to this construction, when the driving part 1020 of the transporting assembly 1030 is activated, the sheet 1028 is held between the respective roller units 1022a and 1022b and roller units 1024a and 1024b and is intermittently transported in the direction of the arrow P. The movement driving part 1006 includes a belt 1016 fitted over and around a pulley 1026a and a pulley 1026b which are placed on rotating shafts disposed oppositely at a given distance, and a motor 1018 which drives in the forward and backward directions the belt 1016 disposed substantially in parallel with the roller units 1022a and 1022b and connected to a carriage member 1010a of the recording part 1010.

When the motor 1018 is in an activated state and the belt 1016 is rotated in the direction of the arrow R, the carriage member 1010a of the recording part 1010 is moved in the direction of the arrow S by a certain distance. When the motor 1018 is in an activated state and the belt 1016 is rotated in the direction reverse to the arrow R shown in the drawing, the carriage member 1010a of the recording part 1010 is moved in the direction reverse to the direction of the arrow S by a certain distance. Further, at one end of the movement driving part 1006, a restoration unit 1026 for performing ejection restoration of the recording part 1010 is provided facing to an ink ejection orifice array of the recording part 1010, at a position serving as the home position of the carriage member 1010a.

In the recording part 1010, ink jet cartridges (hereinafter, simply referred to also as a "cartridge(s)") 1012Y, 1012M, 1012C and 1012Bk are each mounted detachably on the carriage member 1010a for each color, e.g., each of the colors of yellow, magenta, cyan and black.

Figure 2:
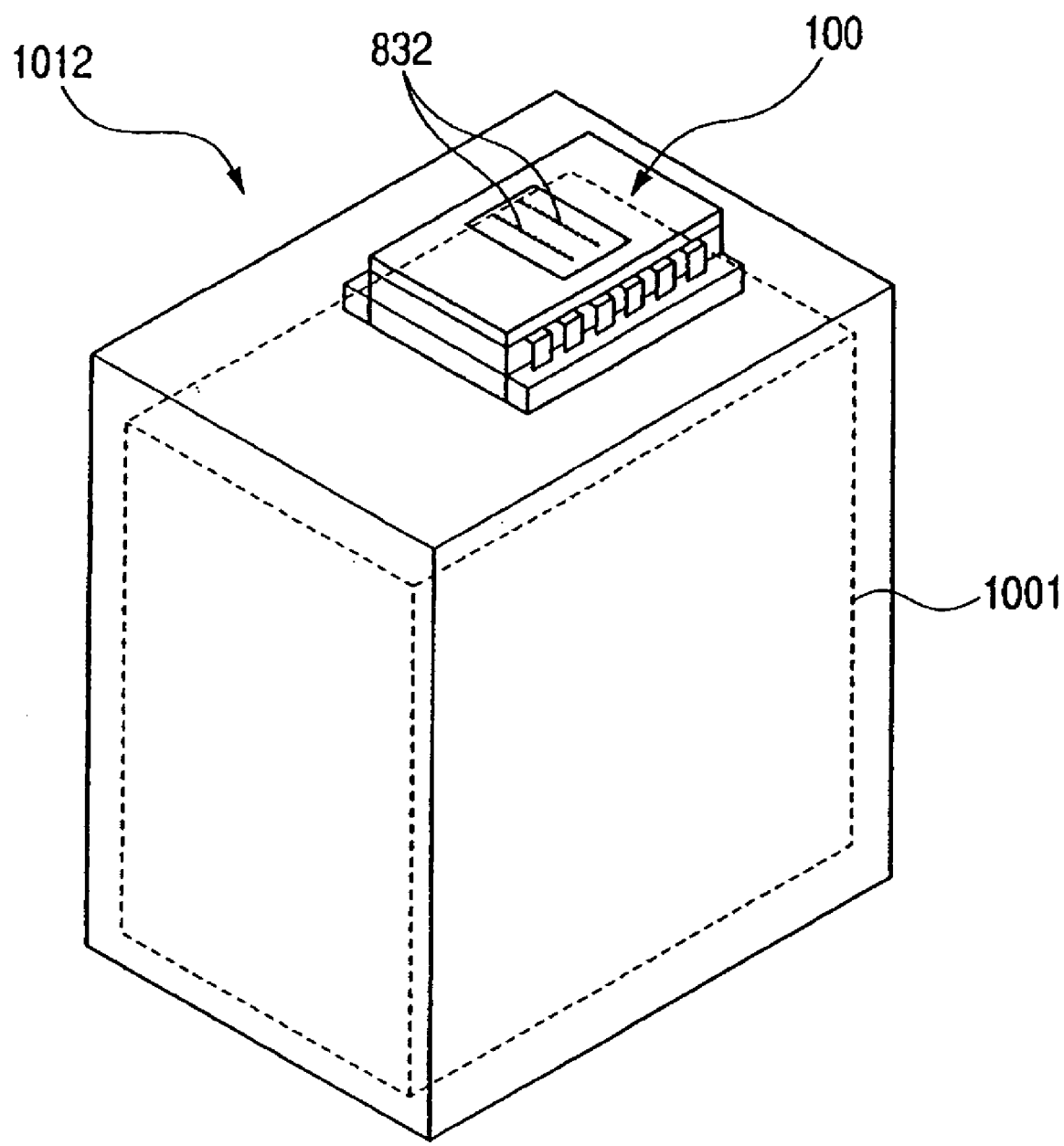
FIG. 2 is a schematic perspective view illustrating one example of an ink jet cartridge equipped with a liquid ejection head.

FIG. 2 illustrates an example of an ink jet cartridge mountable to the ink jet recording apparatus described above. A cartridge 1012 in the example shown in the drawing is of a serial type, and its main part is composed of an ink jet recording head 100 and an ink tank 1001 which holds inks therein.

In the ink jet recording head 100, a large number of ejection orifices 832 for ejecting ink are formed. These orifices are arranged so that ink is led from the ink tank 1001 to a common liquid chamber (not shown) of the liquid ejection head 100 via ink feed channels (not shown). In the cartridge 1012 shown in FIG. 2, the ink jet recording head 100 and the ink tank 1001 are integrally formed so that liquid can be replenished into the ink tank 1001 as needed. The cartridge 1012 may also have a structure in which the ink tank 1001 is so connected to the liquid ejection head 100 as to be replaceable. In this regard, the ink jet cartridge having the ink jet recording head is a recording unit.

EXAMPLES

The present invention will now be described in greater detail based on the following Examples and Comparative examples. In the following, unless otherwise specified, "part(s)" and "%" are by mass. Further, the term "balance" refers to the remainder found by subtracting the sum of each of other components from the whole (100%).

Example 1

Preparation of Ink 1

Ink 1 was prepared by thoroughly mixing and stirring the following components.

| | |
|---|---|
| C.I. Direct Blue 86 | 3% |
| Compound (1) listed in Table 1 | 13% |
| Compound (2) listed in Table 1 | 2% |
| Polyethylene glycol (average molecular weight: 200) | 3% |
| Bishydroxyethyl sulfone | 4% |
| Polyoxyethylene cetyl ether (ethylene oxide addition number 20, HLB 17, nonionic surfactant) | 0.1% |
| Ethylene oxide adduct of acetylene glycol (trade name: Acetylenol EH, manufactured by Kawaken Fine Chemicals Co., Ltd.; nonionic surfactant having an HLB of 10 or more) | 0.1% |
| Ion-exchanged water | balance |

Example 2

Preparation of Ink 2

Ink 2 was prepared by thoroughly mixing and stirring the following components.

| | |
|---|---|
| C.I. Acid Red 37 | 3% |
| Compound (2) listed in Table 1 | 15% |
| $R^5R^6NCONHCH_2CH_2OH$ ($R^5$ = H, $R^6$ = $CH_2CH_2OH$) | 10% |
| Bishydroxyethyl sulfone | 8% |
| Ethylene oxide adduct of acetylene glycol (trade name: Acetylenol EH, manufactured by Kawaken Fine Chemicals Co., Ltd.; nonionic surfactant having an HLB of 10 or more) | 0.2% |
| Ion-exchanged water | balance |

Example 3

Preparation of Ink 3

Ink 3 was prepared by thoroughly mixing and stirring the following components.

| | |
|---|---|
| C.I. Direct Yellow 86 | 3% |
| Compound (5) listed in Table 1 | 15% |
| Bishydroxyethyl sulfone | 2% |
| Polyethylene glycol (average molecular weight: 200) | 5% |
| Triglycerin | 1% |
| Ethylene oxide adduct of acetylene glycol (trade name: Acetylenol EH, manufactured by Kawaken Fine Chemicals Co., Ltd.; nonionic surfactant having an HLB of 10 or more) | 0.3% |
| Ion-exchanged water | balance |

Example 4

Preparation of Ink 4

Ink 4 was prepared by thoroughly mixing and stirring the following components.

| | |
|---|---|
| C.I. Food Black 2 | 3% |
| Compound (1) listed in Table 1 | 18% |
| Polyethylene glycol (average molecular weight: 300) | 2% |
| Diglycerin | 4% |
| Polyoxyethylene cetyl ether (ethylene oxide addition number 40, HLB 20, nonionic surfactant) | 0.2% |
| Ethylene oxide adduct of acetylene glycol (trade name: Acetylenol EH, manufactured by Kawaken Fine Chemicals Co., Ltd.; nonionic surfactant having an HLB of 10 or more) | 0.2% |
| Ion-exchanged water | balance |

Example 5

Preparation of Pigment Dispersion Liquid 1

First, using benzyl methacrylate and methacrylic acid as raw materials, an AB type block polymer having an acid value of 250 and a weight average molecular weight of 3,000 was produced by a conventional method. This polymer was neutralized with an aqueous potassium hydroxide solution and then diluted with ion-exchanged water to prepare a homogeneous aqueous 50% polymer solution. Then, 180 g of the obtained aqueous polymer solution, 100 g of C.I. Pigment Blue 15:3 and 220 g of ion-exchanged water were mixed, and the resultant solution was mechanically stirred for 0.5 hours. Subsequently, using a Microfluidizer, the mixture was allowed to pass five times through the interior of an interaction chamber under application of a liquid pressure of about 10,000 psi (about 70 MPa). Further, the dispersion solution obtained as described-above was centrifuged (at 12,000 rpm for 20 minutes) to remove non-dispersible matter containing coarse particles to prepare cyan color Pigment Dispersion Liquid 1. The Pigment Dispersion Liquid 1 thus obtained had a pigment concentration of 10% and a dispersant concentration of 10%.

(Preparation of Ink 5)

To prepare Ink 5, the above-obtained cyan color Pigment Dispersion Liquid 1 was used in the amount shown below, and each of other components as shown below was added thereto so as to be in a predetermined concentration. These components were thoroughly mixed and stirred, and the resulting solution was then subjected to pressure filtration with a microfilter having a 2.5 μm pore size (manufactured by Fuji Photo Film Co., Ltd.) to prepare Ink 5, having a pigment concentration of 2% and a dispersant concentration of 2%.

| | |
|---|---|
| Pigment Dispersion Liquid 1 | 20% |
| Compound (9) listed in Table 1 | 9% |
| Diglycerin | 5% |
| Bishydroxyethyl sulfone | 4% |
| Polyoxyethylene cetyl ether (ethylene oxide addition number 20, HLB 17, nonionic surfactant) | 0.4% |
| Ethylene oxide adduct of acetylene glycol (trade name: Acetylenol EH, manufactured by Kawaken Fine Chemicals Co., Ltd.; nonionic surfactant having an HLB of 10 or more) | 0.2% |
| Ethylene oxide adduct of acetylene glycol (trade name: Surfynol 440, manufactured by Nisshin Chemical Industry Co., Ltd.; nonionic surfactant having an HLB of 10 or more) | 0.1% |
| Ion-exchanged water | balance |

Example 6

Preparation of Pigment Dispersion Liquid 2

100 g of the same aqueous polymer solution as that used in Preparation of Pigment Dispersion Liquid 1, 100 g of C.I. Pigment Red 122 and 300 g of ion-exchanged water were mixed, and the resultant solution was mechanically stirred for 0.5 hours. Subsequently, using a micro-fluidizer, the resultant mixture was allowed to pass five times through the interior of an interaction chamber under application of a liquid pressure of about 10,000 psi (about 70 MPa). Further, the dispersion liquid obtained as described above was centrifuged (at 12,000 rpm for 20 minutes) to remove non-dispersible matter which containing coarse particles to prepare a magenta color Pigment Dispersion Liquid 2. The Pigment Dispersion Liquid 2 thus obtained had a pigment concentration of 10% and a dispersant concentration of 5%.

(Preparation of Ink 6)

To prepare Ink 6, the above magenta color Pigment Dispersion Liquid 2 was used in the amount shown below, and each of other components as shown below was added thereto so as to be in a predetermined concentration. These components were thoroughly mixed and stirred, and the resulting mixture was subjected to pressure filtration with a microfilter having a 2.5 μm pore size (manufactured by Fuji Photo Film Co., Ltd.) to prepare Ink 6, having a pigment concentration of 4% and a dispersant concentration of 2%.

| | |
|---|---|
| Pigment Dispersion Liquid 2 | 40% |
| Compound (1) listed in Table 1 | 14% |
| Polyethylene glycol (average molecular weight: 300) | 5% |
| Polyethylene glycol (average molecular weight: 1,000) | 1% |
| Polyoxyethylene cetyl ether (ethylene oxide addition number 20, HLB 17, nonionic surfactant) | 0.5% |
| Ethylene oxide adduct of acetylene glycol (trade name: Acetylenol EH, manufactured by Kawaken Fine Chemicals Co., Ltd.; nonionic surfactant having an HLB of 10 or more) | 0.2% |
| Ion-exchanged water | balance |

Example 7

Preparation of Pigment Dispersion Liquid 3

First, using benzyl acrylate and methacrylic acid as raw materials, an AB type block polymer having an acid value of 300 and a weight average molecular weight of 4,000 was produced by a conventional method. This polymer was further neutralized with an aqueous potassium hydroxide solution and then diluted with ion-exchanged water to prepare a homogeneous aqueous 50% polymer solution. Then, 110 g of the above aqueous polymer solution, 100 g of C.I. Pigment Yellow 128 and 290 g of ion-exchanged water were mixed, and the resultant solution was mechanically stirred for 0.5 hours. Subsequently, using a micro-fluidizer, the resultant mixture was allowed to pass five times through the interior of an interaction chamber under application of a liquid pressure of about 10,000 psi (about 70 MPa). Further, the dispersion liquid obtained as described above was centrifuged (at 12,000 rpm for 20 minutes) to remove non-dispersible matter containing coarse particles to prepare yellow color Pigment Dispersion Liquid 3. The Pigment Dispersion Liquid 3 thus obtained had a pigment concentration of 10% and a dispersant concentration of 6%.

(Preparation of Ink 7)

To prepare Ink 7, the above yellow color Pigment Dispersion Liquid 3 was used in the amount shown below, and each of other components as shown below was added thereto so as to be in a predetermined concentration. These components were thoroughly mixed and stirred, and the resulting mixture was subjected to pressure filtration with a microfilter having a 2.5 μm pore size (manufactured by Fuji Photo Film Co., Ltd.) to prepare Ink 7, having a pigment concentration of 5% and a dispersant concentration of 3%.

| | |
|---|---|
| Pigment Dispersion Liquid 3 | 50% |
| Compound (1) listed in Table 1 | 14% |
| Diglycerin | 4% |
| Bishydroxyethyl sulfone | 2% |
| Polyoxyethylene cetyl ether (ethylene oxide addition number 20, HLB 17, nonionic surfactant) | 0.5% |
| Ethylene oxide adduct of acetylene glycol (trade name: Acetylenol EH, manufactured by Kawaken Fine Chemicals Co., Ltd.; nonionic surfactant having an HLB of 10 or more) | 0.3% |
| Ion-exchanged water | balance |

Example 8

Preparation of Pigment Dispersion Liquid 4

First, using benzyl methacrylate, methacrylic acid and ethoxyethylene glycol methacrylate as raw materials, an ABC type block polymer having an acid value of 350 and a weight average molecular weight of 5,000 was produced by a conventional method. This polymer was neutralized with an aqueous potassium hydroxide solution and then diluted with ion-exchanged water to prepare a homogeneous aqueous 50% polymer solution. Then, 60 g of the above aqueous polymer solution, 100 g of carbon black and 340 g of ion-exchanged water were mixed, and the resultant solution was mechanically stirred for 0.5 hours. Subsequently, using a micro-fluidizer, the resultant mixture was allowed to pass five times through the interior of an interaction chamber under application of a liquid pressure of about 10,000 psi (about 70 MPa). Further, the dispersion liquid obtained as described above was centrifuged (at 12,000 rpm for 20 minutes) to remove non-dispersible matter containing coarse particles to prepare black color Pigment Dispersion Liquid 4. The Pigment Dispersion Liquid 4 thus obtained had a pigment concentration of 10% and a dispersant concentration of 3.5%.

(Preparation of Ink 8)

To prepare Ink 8, the above black color Pigment Dispersion Liquid 4 was used in the amount shown below, and each of other components as shown below were added thereto so as to be in a predetermined concentration. These components were thoroughly mixed and stirred, and then the resulting mixture was subjected to pressure filtration with a microfilter having a 2.5 μm pore size (manufactured by Fuji Photo Film Co., Ltd.) to prepare Ink 8, having a pigment concentration of 3% and a dispersant concentration of 1.05%.

| | |
|---|---|
| Pigment Dispersion Liquid 4 | 30% |
| Compound (1) listed in Table 1 | 15% |
| Polyethylene glycol (average molecular weight: 200) | 2% |
| Diglycerin | 5% |
| Glycerin | 1% |
| Bishydroxyethyl sulfone | 2% |
| Polyoxyethylene cetyl ether (ethylene oxide addition number 20, HLB 17, nonionic surfactant) | 0.5% |

-continued

| | |
|---|---|
| Ethylene oxide adduct of acetylene glycol (trade name: Acetylenol EH, manufactured by Kawaken Fine Chemicals Co., Ltd.; nonionic surfactant having an HLB of 10 or more) | 0.3% |
| Ion-exchanged water | balance |

Comparative Example 1

Preparation of Ink 9

Ink 9 was obtained in the same manner as in Example 1, except that the content of Compound (1) listed in Table 1 was changed from 13% for Example 1 to 7%, and the Compound (2) listed in Table 1 was not used, to give the following composition.

| | |
|---|---|
| C.I. Direct Blue 86 | 3% |
| Compound 1 listed in Table 1 | 7% |
| Polyethylene glycol (average molecular weight 200) | 3% |
| Bishydroxyethyl sulfone | 4% |
| Polyoxyethylene cetyl ether (ethylene oxide addition number 20, HLB 17, nonionic surfactant) | 0.1% |
| Ethylene oxide adduct of acetylene glycol (trade name: Acetylenol EH, manufactured by Kawaken Fine Chemicals Co., Ltd.; nonionic surfactant having an HLB of 10 or more) | 0.1% |
| Ion-exchanged water | balance |

Comparative Example 2

Preparation of Ink 10

Ink 10 was obtained in the same manner as in Example 1, except that the 13% content of Compound (1) listed in Table 1 for Example 1 was changed to 41% to vie the following composition.

| | |
|---|---|
| C.I. Direct Blue 86 | 3% |
| Compound (1) listed in Table 1 | 41% |
| Compound (2) listed in Table 1 | 2% |
| Polyethylene glycol (average molecular weight: 200) | 3% |
| Bishydroxyethyl sulfone | 4% |
| Polyoxyethylene cetyl ether (ethylene oxide addition number 20, HLB 17, nonionic surfactant) | 0.1% |
| Ethylene oxide adduct of acetylene glycol (trade name: Acetylenol EH, manufactured by Kawaken Fine Chemicals Co., Ltd.; nonionic surfactant having an HLB of 10 or more) | 0.1% |
| Ion-exchanged water | balance |

Comparative Example 3

Preparation of Ink 11

Ink 11 was obtained in the same manner as in Example 1, except that the polyethylene glycol content was changed from 3% in Example 1 to 2%, and the bishydroxyethyl sulfone content was changed from 4% in Example 1 to 2%, to give the following composition.

| | |
|---|---|
| C.I. Direct Blue 86 | 3% |
| Compound (1) listed in Table 1 | 13% |
| Compound (2) listed in Table 1 | 2% |

-continued

| | |
|---|---|
| Polyethylene glycol (average molecular weight: 200) | 2% |
| Bishydroxyethyl sulfone | 2% |
| Polyoxyethylene cetyl ether (ethylene oxide addition number 20, HLB 17, nonionic surfactant) | 0.1% |
| Ethylene oxide adduct of acetylene glycol (trade name: Acetylenol EH, manufactured by Kawaken Fine Chemicals Co., Ltd.; nonionic surfactant having an HLB of 10 or more) | 0.1% |
| Ion-exchanged water | balance |

Comparative Example 4

Preparation of Ink 12

Ink 12 was obtained in the same manner as in Example 1, except that the polyethylene glycol content was changed from 3% in Example 1 to 16%, and the bishydroxyethyl sulfone content was changed from 4% in Example 1 to 15%, to give the following composition.

| | |
|---|---|
| C.I. Direct Blue 86 | 3% |
| Compound (1) listed in Table 1 | 13% |
| Compound (2) listed in Table 1 | 2% |
| Polyethylene glycol (average molecular weight: 200) | 16% |
| Bishydroxyethyl sulfone | 15% |
| Polyoxyethylene cetyl ether (ethylene oxide addition number 20, HLB 17, nonionic surfactant) | 0.1% |
| Ethylene oxide adduct of acetylene glycol (trade name: Acetylenol EH, manufactured by Kawaken Fine Chemicals Co., Ltd.; nonionic surfactant having an HLB of 10 or more) | 0.1% |
| Ion-exchanged water | balance |

Comparative Example 5

Preparation of Ink 13

Ink 13 was obtained in the same manner as in Example 2, except that glycerin was used in place of the Compound (2) listed in Table 1 for Example 2 to give the following composition.

| | |
|---|---|
| C.I. Acid Red 37 | 3% |
| Glycerin | 15% |
| $R^5R^6NCONHCH_2CH_2OH$ ($R^5$ = H, $R^6$ = $CH_2CH_2OH$) | 10% |
| Bishydroxyethyl sulfone | 8% |
| Ethylene oxide adduct of acetylene glycol (trade name: Acetylenol EH, manufactured by Kawaken Fine Chemicals Co., Ltd.; nonionic surfactant having an HLB of 10 or more) | 0.2% |
| Ion-exchanged water | balance |

Comparative Example 6

Preparation of Ink 14

Ink 14 was obtained in the same manner as in Example 2, except that diethylene glycol was used in place of the Compound (2) listed in Table 1 for Example 2 to give the following composition.

| | |
|---|---|
| C.I. Acid Red 37 | 3% |
| Diethyleneglycol | 15% |

-continued

| | |
|---|---|
| $R^5R^6NCONHCH_2CH_2OH$ ($R^5$ = H, $R^6$ = $CH_2CH_2OH$) | 10% |
| Bishydroxyethyl sulfone | 8% |
| Ethylene oxide adduct of acetylene glycol (trade name: Acetylenol EH, manufactured by Kawaken Fine Chemicals Co., Ltd.; nonionic surfactant having an HLB of 10 or more) | 0.2% |
| Ion-exchanged water | balance |

Comparative Example 7

Preparation of Ink 15

Ink 15 was obtained in the same manner as in Example 2, except that contents of the Compound (2) listed in Table 1 for Example 2, the compound represented by general formula (II) and bishydroxyethyl sulfone were changed to give the following composition.

| | |
|---|---|
| C.I. Acid Red 37 | 3% |
| Compound (2) listed in Table 1 | 8% |
| $R^5R^6NCONHCH_2CH_2OH$ ($R^5$ = H, $R^6$ = $CH_2CH_2OH$) | 15% |
| Bishydroxyethyl sulfone | 10% |
| Ethylene oxide adduct of acetylene glycol (trade name: Acetylenol EH, manufactured by Kawaken Fine Chemicals Co., Ltd.; nonionic surfactant having an HLB of 10 or more) | 0.2% |
| Ion-exchanged water | balance |

Comparative Example 8

Preparation of Ink 16

Ink 16 was obtained in the same manner as in Example 2, except that contents of the Compound (2) listed in Table 1 for Example 2, the compound represented by general formula (II) and bishydroxyethyl sulfone were changed to give the following composition.

| | |
|---|---|
| C.I. Acid Red 37 | 3% |
| Compound (2) listed in Table 1 | 36% |
| $R^5R^6NCONHCH_2CH_2OH$ ($R^5$ = H, $R^6$ = $CH_2CH_2OH$) | 4% |
| Bishydroxyethyl sulfone | 1% |
| Ethylene oxide adduct of acetylene glycol (trade name: Acetylenol EH, manufactured by Kawaken Fine Chemicals Co., Ltd.; nonionic surfactant having an HLB of 10 or more) | 0.2% |
| Ion-exchanged water | balance |

(Evaluation)

The inks obtained in Examples 1 to 8 (Inks 1 to 8) and those in Comparative examples 1 to 8 (Inks 9 to 16) were evaluated in the following way. The ink jet recording apparatus used in evaluation items 1), 2) and 3) is shown in FIG. 1 and FIG. 2. The recording head used in the evaluation had a recording density of 1,200 dpi and an ejection volume of 4 pL per dot.

[Evaluation Items]

1) Frequency Response:

Using a thermal system ink jet recording apparatus manufactured by Canon Inc., ink was ejected at a driving frequency of 0.1 kHz. The frequency was gradually increased and measured at the point where ejection became so unstable that the ejection shape included no primary droplet, and evaluation was made according to the following criteria. The evaluation results are shown in Table 2.

A: More than 10 kHz.
B: 5 to 10 kHz.
C: Less than 5 kHz.

2) Startup Properties

After a head cleaning operation had been performed for the above-described recording apparatus, solid image printing was conducted on a sheet of A4 size plain paper (SW-101, manufactured by Canon Inc.) at a frequency of 1 kHz. The head was left standing without being capped in a 25° C. and 30% humidity environment. After 30 seconds, solid image printing was conducted again, and the initial and first ejection state of each nozzle was confirmed. The evaluation criteria were as follows. The evaluation results are shown in Table 2.

A: Each nozzle conducted normal ejection
B: Ejection direction shifted and the ejection amount decreased
C: Some nozzles conducted no ejection 3) Curling Resistance:

Using the above-described recording apparatus, solid image printing was carried out on a sheet of A4 size plain paper (SW-101 manufactured by Canon Inc.) in an application amount of ink of 10 mg/cm$^2$ so that the recording area was 4 cm×5 cm. The resulting printed paper was placed in a 25° C. and 55% humidity environment. Visual evaluation was performed by observing the condition of the printed paper after 1 hour and after 10 days. The evaluation criteria were as follows. The evaluation results are shown in Table 2.

A: Substantially flat state was maintained
B: Edge portions were raised
C: Cylindrical shape was formed

TABLE 2

| | | | | Evaluation item (3) | |
|---|---|---|---|---|---|
| | Ink | Evaluation item (1) | Evaluation item (2) | After 1 hour | After 10 days |
| Example 1 | Ink 1 | A | A | A | A |
| Example 2 | Ink 2 | A | A | A | A |
| Example 3 | Ink 3 | A | A | A | A |
| Example 4 | Ink 4 | A | A | A | A |
| Example 5 | Ink 5 | A | A | A | A |
| Example 6 | Ink 6 | A | A | A | A |
| Example 7 | Ink 7 | A | A | A | A |
| Example 8 | Ink 8 | A | A | A | A |
| Comparative example 1 | Ink 9 | A | B | B | C |
| Comparative example 2 | Ink 10 | B | B | A | A |
| Comparative example 3 | Ink 11 | A | A | A | B |
| Comparative example 4 | Ink 12 | C | C | A | A |
| Comparative example 5 | Ink 13 | A | A | C | C |
| Comparative example 6 | Ink 14 | A | A | C | C |
| Comparative example 7 | Ink 15 | A | B | B | C |
| Comparative example 8 | Ink 16 | B | A | A | A |

From the results of evaluation items 1) to 3) shown in Table 2, it was confirmed that all the inks according to Examples 1 to 8 had good ink jet ejection suitability and curling resistance. On the other hand, the inks of Comparative examples 1 to 8 did not have sufficient curling resistance, in which the contents of the compounds represented by general formula (I) were outside the defined range, the amounts of water-soluble substances used in combination were outside the defined range, or the mass ratio of the two substances was outside the defined range. Even when such inks had good curling resistance, they were confirmed to have problems concerning the startup properties and response during ejection at a high frequency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-103725, filed Apr. 5, 2006, which is hereby incorporated by reference herein in its entirety.

What is claimed is:

1. An ink jet recording ink comprising at least water, a colorant, a compound represented by the following general formula (I) accounting for 8 to 40% by mass of a total mass of the ink, and a water-soluble substance accounting for 5 to 30% by mass of the total mass of the ink, wherein the water-soluble substance is at least one compound selected from the group consisting of a compound represented by the following general formula (II), polyalkylene glycol having a molecular weight of 200 to 1,000, polyglycerin, and bishydroxyethyl sulfone, and a ratio (A/B) of mass (A) of the compound represented by general formula (I) and mass (B) of the water-soluble substance is in a range of 1/3 to 7/1, General formula (I)

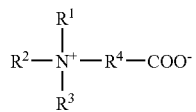

wherein $R^1$, $R^2$, and $R^3$ each independently represent a hydrogen atom or an alkyl group having 1 to 4 carbon atoms, and $R^4$ represents an alkylene group having 1 to 5 carbon atoms, and $$R^5R^6NCONHCH_2CH_2OH \qquad \text{General formula (II)}$$

wherein $R^5$ and $R^6$ each independently represent a hydrogen atom or $C_nH_{2n}OH$, n is 2 or 3, and $R^5$ and $R^6$ are not a hydrogen atom at the same time.

2. The ink jet recording ink according to claim 1, wherein the compound represented by general formula (I) is trimethyl glycine.

3. An ink jet recording method which conducts recording by utilizing an ink jet recording head to apply ink onto a recording medium containing cellulose where a recording area on the recording medium is 15 cm² or more, and an amount of ink applied onto the recording medium is 0.03 to 30 mg/cm²,
wherein the ink applied onto the recording medium comprises at least water, a colorant, a compound represented by the following general formula (I) accounting for 8 to 40% by mass of a total mass of the ink, and a water-soluble substance accounting for 5 to 30% by mass of the total mass of the ink, wherein the water-soluble substance is at least one compound selected from the group consisting of a compound represented by the following general formula (II), polyalkylene glycol having a molecular weight of 200 to 1,000, polyglycerin, and bishydroxyethyl sulfone, and a ratio (A/B) of mass (A) of the compound represented by general formula (I) and mass (B) of the water-soluble substance is in a range of 1/3 to 7/1, General formula (I)

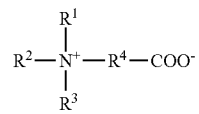

wherein $R^1$, $R^2$, and $R^3$ each independently represent a hydrogen atom or an alkyl group having 1 to 4 carbon atoms, and $R^4$ represents an alkylene group having 1 to 5 carbon atoms, and $$R^5R^6NCONHCH_2CH_2OH \qquad \text{General formula (II)}$$

wherein $R^5$ and $R^6$ each independently represent a hydrogen atom or $C_nH_{2n}OH$, n is 2 or 3, and $R^5$ and $R^6$ are not a hydrogen atom at the same time.

4. The ink jet recording method according to claim 3, wherein the amount of ink applied onto the recording medium is in a range of 0.1 to 20 mg/cm².

5. The ink jet recording method according to claim 3, wherein the recording medium containing cellulose is plain paper.

6. An ink jet recording apparatus comprising an ink storage portion for storing the ink according to claim 1, and an ink jet head for ejecting the ink.

7. The ink jet recording ink according to claim 1, wherein the water-soluble substance comprises a compound represented by general formula (II).

8. The ink jet recording ink according to claim 1, wherein the water-soluble substance comprises polyalkylene glycol having a molecular weight of 200 to 1,000.

9. The ink jet recording ink according to claim 1, wherein the water-soluble substance comprises polyglycerin.

10. The ink jet recording ink according to claim 1, wherein the water-soluble substance comprises bishydroxyethyl sulfone.

* * * * *